United States Patent
Chen

[11] Patent Number: 5,877,570
[45] Date of Patent: Mar. 2, 1999

[54] DRIVING DEVICE OF MASSAGING CHAIR

[76] Inventor: Yuan-Chuen Chen, 18 Wuey Chung Street Wuey Chung Village, Fu Sing Hsiang, Chan Hua Hsien, Taiwan

[21] Appl. No.: 30,881

[22] Filed: Feb. 26, 1998

[51] Int. Cl.⁶ ........................................ H02K 7/10
[52] U.S. Cl. ........................ 310/75 R; 601/23; 601/24; 601/25; 601/98; 601/99; 601/102; 601/112; 601/116; 74/5.7; 74/5.8; 74/5.9; D6/367; D6/360
[58] Field of Search ............................ 310/75 R; 601/98, 601/99, 102, 112, 116, 23, 24, 25; D6/367, 360; 74/5.7, 5.8, 5.9

[56] References Cited

U.S. PATENT DOCUMENTS

| | | | |
|---|---|---|---|
| 4,686,967 | 8/1987 | Hasimoto et al. | 601/116 |
| 5,137,016 | 8/1992 | Yamasaki et al. | 601/116 |
| 5,462,516 | 10/1995 | Anderson | 601/99 |

*Primary Examiner*—Thomas M. Dougherty
*Assistant Examiner*—Thanh Lam
*Attorney, Agent, or Firm*—Harrison & Egbert

[57] ABSTRACT

A driving device of the massaging chair including a main shaft, a bevel gear mounted on one end of the main shaft, a worm rod mounted on another end of the main shaft, and a driving rotor mounted slidably between the bevel and the worm rod. When the main shaft is driven by a motor to turn forward, the driving rotor is engaged with the bevel gear to actuate a kneading shaft of the massaging chair. When the main shaft is driven by the motor to turn backward, the driving rotor becomes disengaged with the bevel gear and moves away from the bevel gear to engage the worm rod so as to actuate a beating shaft of the massaging chair.

1 Claim, 6 Drawing Sheets

5,877,570

DRIVING DEVICE OF MASSAGING CHAIR

FIELD OF THE INVENTION

The present invention relates generally to a massaging chair, and more particularly to a driving device of the massaging chair.

BACKGROUND OF THE INVENTION

As illustrated in FIG. 1, a conventional driving device of the massaging chair consists of a motor "M" for driving a main shaft 11 on which a bevel gear 12 is mounted such that the bevel gear 12 is engaged with a spiral gear 131 mounted on a rotary shaft 13. A worm rod 14 is mounted on another end of the main shaft 11 for linking a rotary shaft 15 at a lower speed in conjunction with a worm wheel 16 mounted on a rotary shaft 15. Since the rotary shafts 13 and 15 are incapable of synchronous rotation, the transmissions of the bevel gear 12 and the worm rod 14 are brought about by the main shaft 11 in cooperation with a clutch 20. As shown in FIG. 2, the clutch 20 comprises a left locating sleeve 21 and a right locating sleeve 22. The left locating sleeve 21 is provided with two locating holes 211 opposite in location to each other, whereas the right locating sleeve 22 is provided with two locating holes 221 opposite in location to each other. As a result, the locating sleeves 21 and 22 can be located securely on a locating shaft 101 of a main body 10 such that a rotor 23 is rotatably fastened between the two sleeves 21 and 22 in conjunction with two rings 24 which are resistant to wear and heat. The rotor 23 is provided with a spiral hole 231, which is engaged with a spiral rotor 25 which is provided respectively at both ends thereof with an end gear 252 corresponding in location to the end gears 121 and 141 of the bevel gear 12 and the worm rod 14. The spiral rotor 25 is provided at one end thereof with a polygonal hole 251, which is engaged with a polygonal portion of the main shaft 11 such that the spiral rotor 25 is capable of sliding freely on the main shaft 11.

When the motor "M" starts to turn forward to drive the main shaft 11, the spiral rotor 25 is actuated to turn in the spiral hole 231 of the rotor 23 such that the end gear 252 of the spiral rotor 25 moves toward the bevel gear 12. The end gear 252 of the rotor 25 is securely engaged with the end gear 121 of the bevel gear 12. When the spiral rotor 25 is incapable of axial displacement inside the spiral hole 231 of the rotor 23, the rotor 23 and the spiral rotor 25 can be actuated synchronously. When the main shaft 11 is driven to turn backward, the spiral rotor 25 is actuated to displace likewise such that the end gear 252 of the spiral rotor 25 is engaged with the end gear 141 of the worm rod 14. The worm rod 14 and the rotor 23 are thus actuated synchronously by the spiral rotor 25 to turn. With the cooperation of the clutch 20, the main shaft 11 is capable of linking independently the rotary shaft 13 and the rotary shaft 15. In other words, the rotary shafts 13 and 15 are caused to turn at different speeds by the forward rotation and the reverse rotation of the main shaft 11. As a result, when the rotary shaft 13 is turned, the massaging chair is capable of bringing about a kneading effect. On the other hand, when the rotary shaft 15 is turned, the massaging chair brings about a beating effect.

Such a prior art driving device as described above has several shortcomings, which are described explicitly hereinafter.

It is technically difficult to make the rotor 23 and the spiral rotor 25 by a plastic injection molding. Such injection molding is expensive and often results in a high rejection rate of the rotors.

The clutch 20 is composed of many component parts which can not be easily assembled with precision. For example, the locating sleeves 21 and 22 can not be assembled with the locating shaft 101 of the main body 10 with ease and precision.

After a prolonged service, the rotor 23 and the spiral rotor 25 are vulnerable to deformation. In addition, the rotor 23 and the spiral rotor 25 must be lubricated from time to time so as to ensure that they are capable of smooth engagement. Moreover, a mechanical friction can take place between the rotor 23 and the locating sleeve 21 or 22 at such time when the rotor 23 rotates at a high speed along with the spiral rotor 25.

SUMMARY OF THE INVENTION

The primary objective of the present invention is therefore to provide the massaging chair with an improved driving device free from the shortcomings of the prior art driving device described above.

In keeping with the principle of the present invention, the foregoing objective of the present invention is attained by a driving device devoid of the clutch of the prior art driving device, so as to simplify the construction of the driving device of the present invention. As a result, the process of making the driving device of the present invention is cost-effective.

The objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
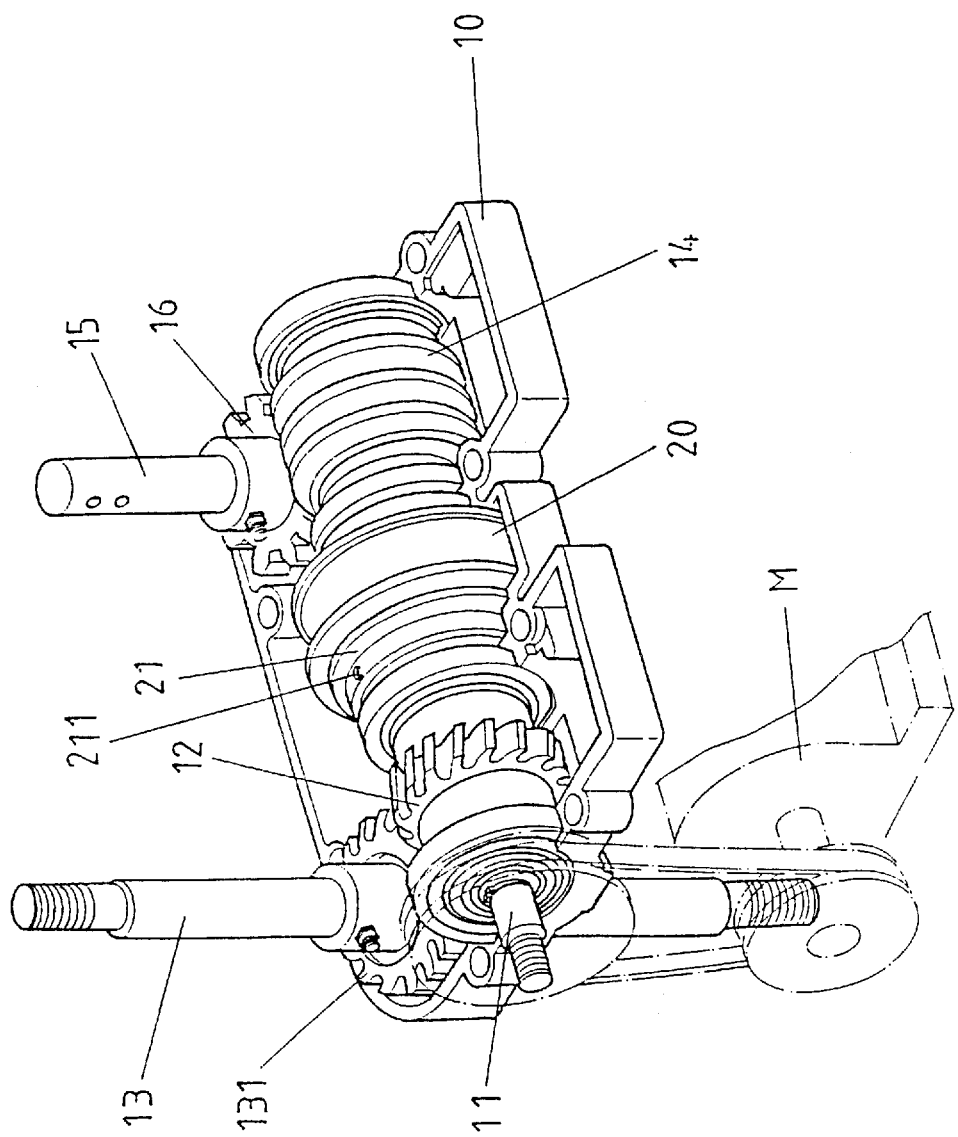
FIG. 1 shows a perspective view of a prior art driving device of the massaging chair.
Figure 2:
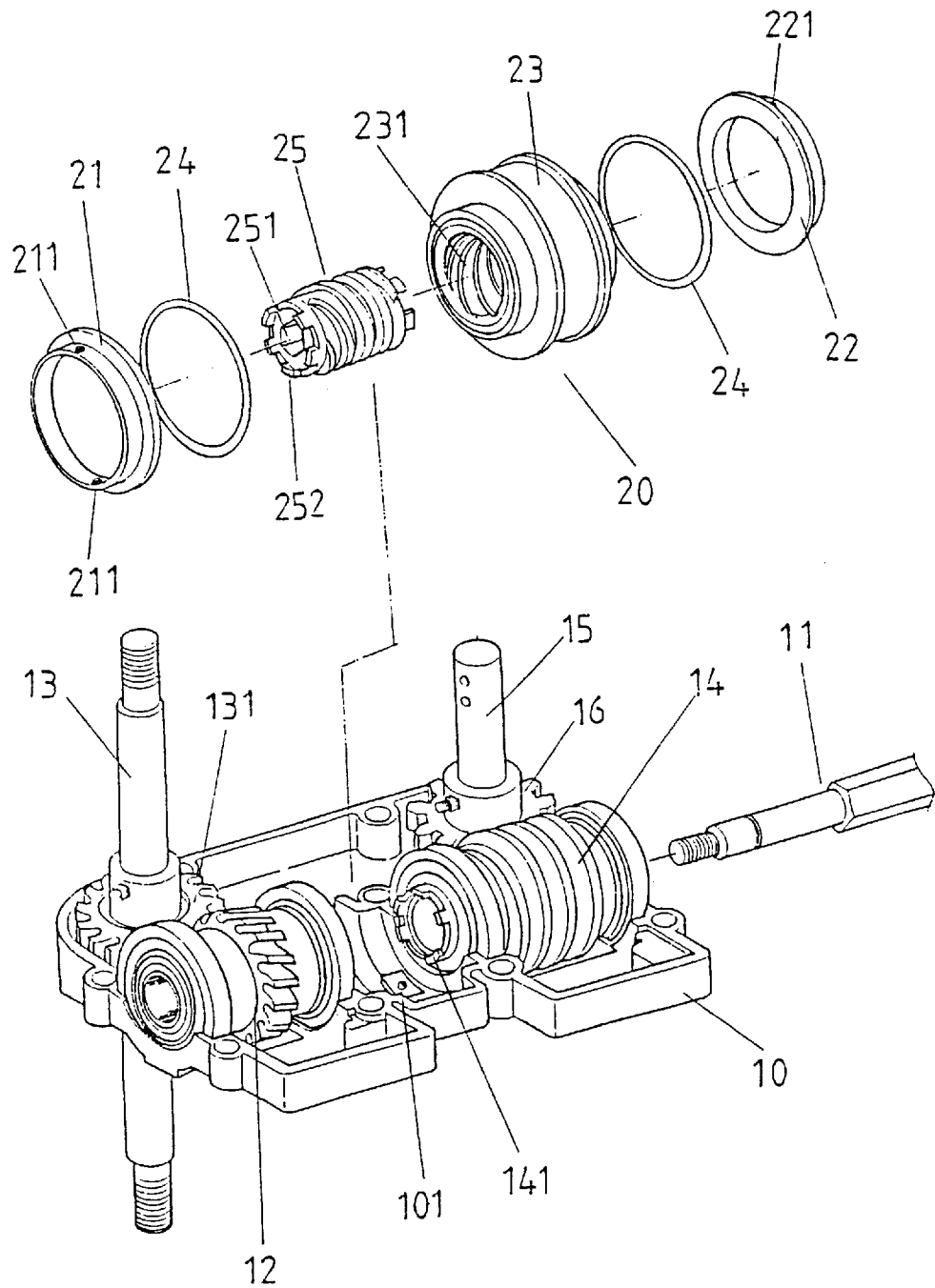
FIG. 2 shows an exploded view of a clutch of the prior art driving device as shown in FIG. 1.
Figure 3:
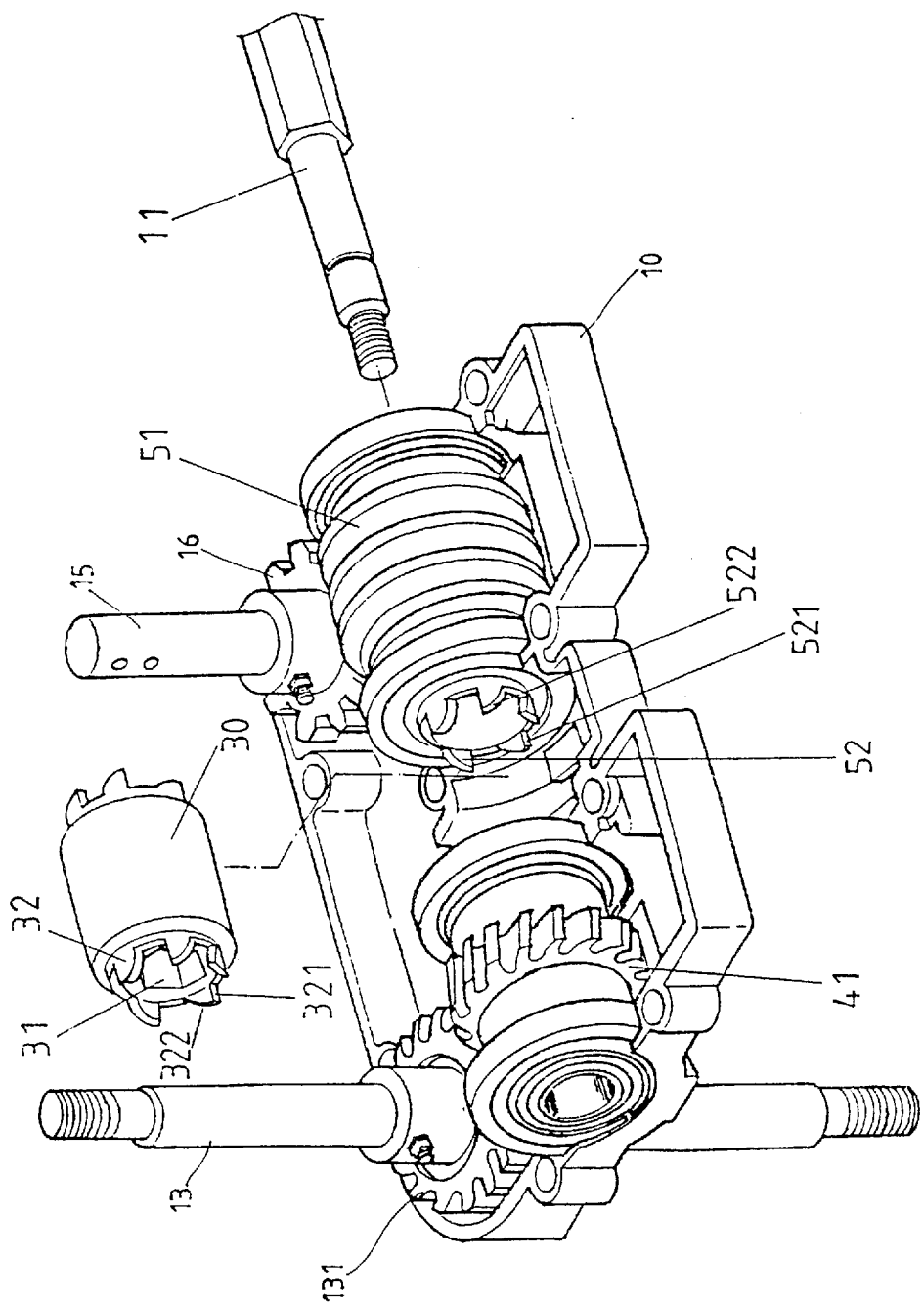
FIG. 3 shows a perspective view of a driving device of the present invention for use in a massaging chair.

As shown in FIGS. 3–6, a driving device of the present invention is intended for use in a massaging chair and is composed of a base 10, a driving rotor 30, a bevel gear 41, and a worm rod 51.

The base 10 is provided with a main shaft 11 mounted thereon such that the main shaft 11 is driven by a motor (not shown in the drawings) to turn forward or backward. The main shaft 11 has a polygonal portion (not shown in the drawing).

The driving rotor 30 is provided with a polygonal hole 31 engageable with the polygonal portion of the main shaft 11 and is further provided respectively at both ends thereof with an end gear 32 made integrally therewith. The end gear 32 has a plurality of teeth each having a parallel side 321 parallel to the longitudinal axis of the driving rotor 30, and an arcuate side 322. The driving rotor 30 is pivotally fastened with the main shaft 11 such that the polygonal hole 31 of the driving rotor 30 is engaged with the polygonal portion of the main shaft 11.

The bevel gear 41 is mounted on one end of the main shaft 11 and is provided with an end gear 42 corresponding in location to the end gear 32 of the driving rotor 30. The end gear 42 is made integrally with the bevel gear 41 and is composed of a plurality of teeth each having a parallel side 421 and an arcuate side 422. The parallel side 421 and the arcuate side 422 are similar in construction to the parallel side 321 and the arcuate side 322.

The worm rod 51 is mounted on another end of the main shaft 11 such that the driving rotor 30 is located between the worm rod 51 and the bevel gear 41. The worm rod 51 is provided with an end gear 52 corresponding in location to the end gears 32 and 42. The end gear 52 is made integrally with the worm rod 51 and is composed of a plurality of teeth each having a parallel side 521 and an arcuate side 522, which are respectively similar in construction to the parallel sides 321 and 421, and the arcuate sides 322 and 422.

Figure 4:
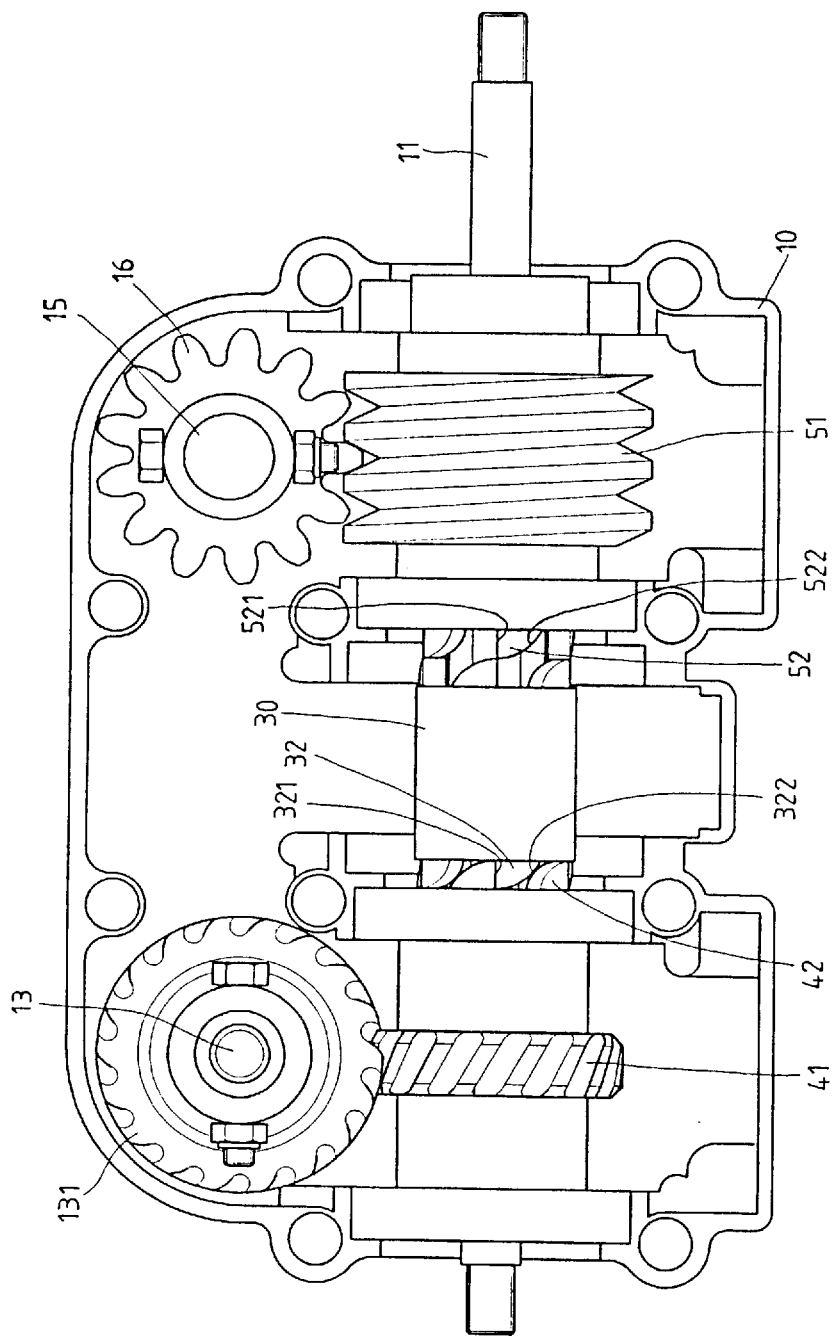
FIG. 4 shows a plan view of the driving device of the present invention.

As illustrated in FIG. 4 when the main shaft 11 is driven to turn forward, the driving rotor 30 is actuated to turn likewise such that the parallel sides 321 of the end gear 32 of the driving rotor 30 are engaged with the parallel sides 421 of the end gear 42 of the bevel gear 41. As a result, a kneading shaft 13 of the massage chair (not shown in the drawing) is actuated by the bevel gear 41 to turn at a speed. The massage chair is thus capable of bringing about a kneading effect. The bevel gear 41 is engaged with a spiral gear 131 of the kneading shaft 13.

Figure 5:
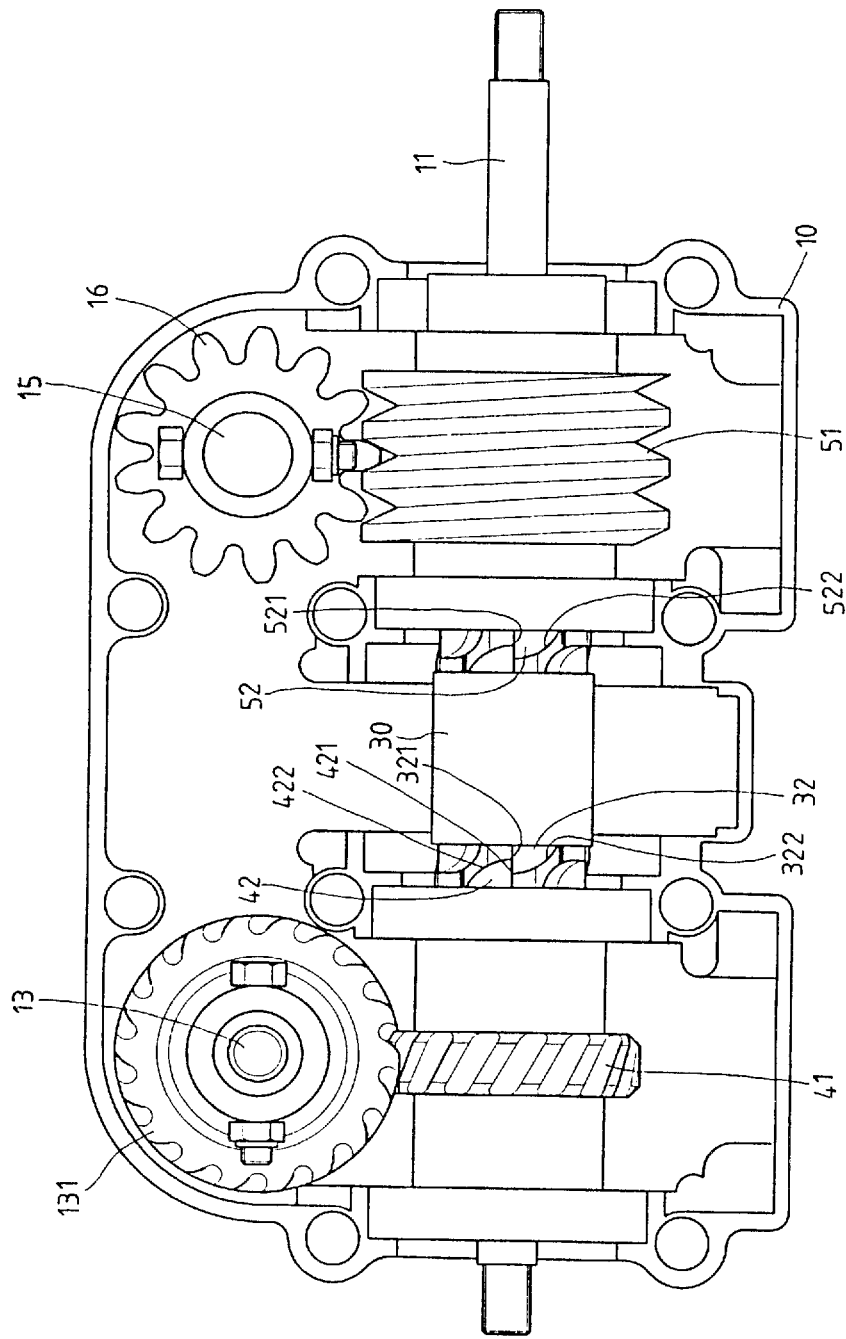
FIG. 5 shows a schematic view of the present invention in operation.
Figure 6:
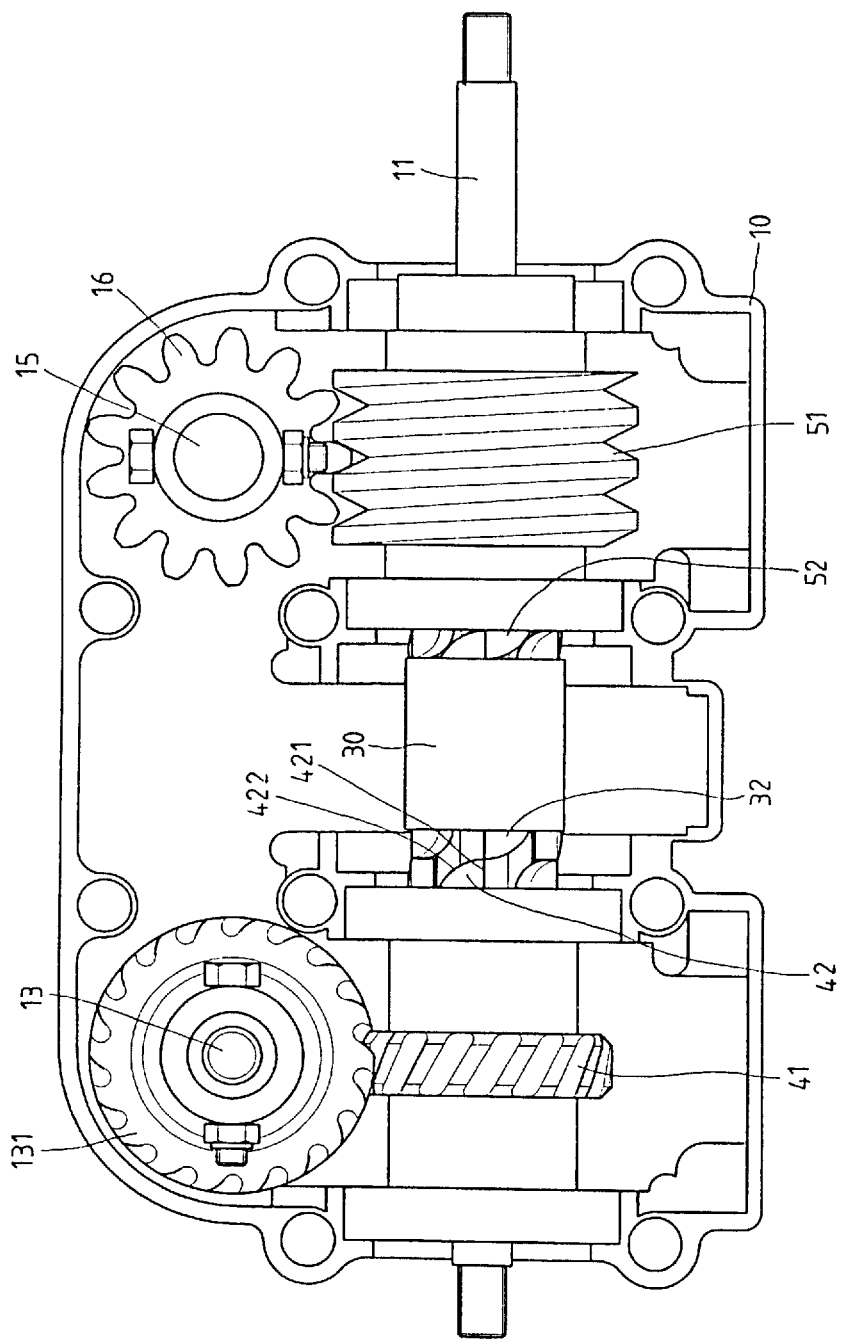
FIG. 6 shows another schematic view of the present invention at work..

As illustrated in FIGS. 5 and 6, when the main shaft 11 is driven by the motor to turn backward, the driving rotor 30 is actuated to turn likewise such that the parallel sides 321 of the end gear 32 of the driving rotor 30 are no longer engaged with the parallel sides 421 of the end gear 42 of the bevel gear 41, and that the arcuate sides 322 of the end gear 32 of the driving rotor 30 are pushed by the parallel sides 422 of the end gear 42 of the bevel gear 41. As a result, the driving rotor 30 is disengaged with the bevel gear 41 to move toward the end gear 52 of the worm rod 51 such that the parallel sides 321 of the driving rotor 30 are engaged with the parallel sides 521 of the worm rod 51, and that a beating shaft 15 of the massaging chair is thus actuated to turn, thereby enabling the massaging chair to bring about a beating effect. Since the worm rod 51 is engaged with a worm wheel 16 mounted on the beating shaft 15, the beating shaft 15 can be actuated to turn at the time when the worm rod 51 is actuated by the driving rotor 30.

It is therefore readily apparent that the driving device of the present invention is relatively simple in construction and cost-effective. The driving rotor of the present invention works with precision and without mechanical friction. The advantages of the driving rotor of the present invention over the clutch of the driving device of the prior art are thus readily apparent.

The embodiment of the present invention described above is to be deemed in all respects as being merely illustrative and not restrictive. Accordingly. the present invention may be embodied in other specific forms without deviating from the spirit thereof. The present invention is therefore to be limited only by the scope of the following appended claim.

What is claimed is:

1. A driving device of a massaging chair, said driving device comprising:

a base;

a main shaft rotatably mounted on said base such that said main shaft can be driven by a motor to turn forward or backward, said main shaft provided with a polygonal portion;

a bevel gear mounted on one end of said main shaft and provided with an end gear made integrally therewith, said end gear having a plurality of teeth each having a parallel side and an arcuate side, said parallel side being parallel to a longitudinal axis of said bevel gear;

a worm rod mounted on another end of side main shaft and provided with an end gear made integrally therewith, said end gear of said worm rod facing said end gear of said bevel gear and having a plurality of teeth each having a parallel side and an arcuate side, said parallel side being parallel to a longitudinal axis of said worm rod; and a driving rotor mounted slidably on said main shaft and located between said bevel gear and said worm rod such that said bevel gear can be actuated by said driving rotor to drive a kneading shaft of the massaging chair, and that said worm rod can be actuated by said driving rotor to drive a beating shaft of the massaging chair;

wherein said driving rotor is provided respectively at both ends thereof with an end gear made integrally therewith, said end gear having a plurality of teeth each having a parallel side and an arcuate side, said parallel side being parallel to a longitudinal axis of said driving rotor, said parallel side of said teeth of said end gear located at one end of said driving rotor being capable of engaging said parallel side of said teeth of said end gear of said worm rod at such time when said main shaft is driven by the motor to turn backward to cause said driving rotor to disengage said bevel gear to move toward said worm rod.

* * * * *